United States Patent
Nurmi et al.

(10) Patent No.: US 10,227,446 B2
(45) Date of Patent: Mar. 12, 2019

(54) METHOD OF PRODUCING GLYCOLIC ACID POLYMERS

(71) Applicant: Teknologian tutkimuskeskus VTT Oy, Espoo (FI)

(72) Inventors: Leena Nurmi, Espoo (FI); Thomas Gädda, Espoo (FI)

(73) Assignee: Teknologian tutkimuskeskus VTT Oy, Espoo (FI)

( * ) Notice: Subject to any disclaimer, the term of this patent is extended or adjusted under 35 U.S.C. 154(b) by 0 days.

(21) Appl. No.: 15/521,308

(22) PCT Filed: Nov. 6, 2015

(86) PCT No.: PCT/FI2015/050768
§ 371 (c)(1),
(2) Date: Apr. 24, 2017

(87) PCT Pub. No.: WO2016/071574
PCT Pub. Date: May 12, 2016

(65) Prior Publication Data
US 2018/0201724 A1    Jul. 19, 2018

(30) Foreign Application Priority Data
Nov. 6, 2014    (FI) .................................... 20145973

(51) Int. Cl.
| | |
|---|---|
| *C08G 63/06* | (2006.01) |
| *C08G 63/87* | (2006.01) |
| *C08G 18/42* | (2006.01) |
| *C08G 63/80* | (2006.01) |
| *C08G 63/82* | (2006.01) |
| *C08G 63/91* | (2006.01) |
| *B01J 31/02* | (2006.01) |
| *C08G 63/81* | (2006.01) |
| *C08G 63/88* | (2006.01) |

(52) U.S. Cl.
CPC .......... *C08G 63/06* (2013.01); *B01J 31/0225* (2013.01); *C08G 18/4283* (2013.01); *C08G 63/80* (2013.01); *C08G 63/81* (2013.01); *C08G 63/823* (2013.01); *C08G 63/87* (2013.01); *C08G 63/88* (2013.01); *C08G 63/912* (2013.01)

(58) Field of Classification Search
USPC ........................................................ 528/290
See application file for complete search history.

(56) References Cited

U.S. PATENT DOCUMENTS

| | | |
|---|---|---|
| 2,676,945 A | 4/1954 | Higgins |
| 2,683,136 A | 7/1954 | Higgins |
| 3,442,871 A | 5/1969 | Schmitt et al. |
| 4,424,242 A | 1/1984 | Barbee |
| 4,454,274 A | 6/1984 | Singer et al. |
| 4,565,851 A | 1/1986 | Barbee |
| 4,650,851 A | 3/1987 | Rhum et al. |
| 4,729,927 A | 3/1988 | Hirose et al. |
| 5,223,630 A | 6/1993 | Lin |
| 5,380,813 A | 1/1995 | Seppälä et al. |
| 7,235,673 B2 | 6/2007 | Yamane et al. |
| 2006/0217523 A1 | 9/2006 | Tan et al. |
| 2009/0176963 A1 | 7/2009 | Abiko et al. |
| 2011/0065871 A1 | 3/2011 | Nagano et al. |
| 2012/0027973 A1 | 2/2012 | Wautier |
| 2014/0100350 A1 | 4/2014 | He et al. |
| 2014/0309366 A1 | 10/2014 | Shan et al. |

FOREIGN PATENT DOCUMENTS

| | | |
|---|---|---|
| EP | 2 280 036 A1 | 2/2011 |
| EP | 2 716 678 A1 | 4/2014 |
| GB | 825335 A | 12/1959 |
| WO | 2010112602 A1 | 10/2010 |

OTHER PUBLICATIONS

Handbook of Chemistry and Physics, 89th edition, ed. Lide DR, CRC Press, 2008, pp. 3-86.
Registry, ACS, STN International: RN 104-15-4.
Registry, ACS, STN International: RN 21668-77-9.
Registry, ACS, STN International: RN 75-75-2.
Vert et al: Stereoregular bioresorbable polyesters for orthopaedic surgery. Makromol Chem Suppl, Apr. 15, 1981, vol. 5, pp. 30-41.
Anonymous: "Toxicology Data for p-toluene sulfonic acid", TOXNET (Toxicology data network), Feb. 14, 2003 (Feb. 14, 2003), pp. 1-16, XP055473697, URL:https://toxnet.nlm.nih.gov/cgi-bin/sis/search2/r?dbs+hsdb:@term+@rn+@rel+l04-15-4.
Berthoud A Ed—Berthoud A: "Quelques Proprietes Physico-Chimique Des Acides Ethane-Et Methane-Sulfonique", Helv. Chim. Acta, vol. 12, Jan. 1, 1929 (Jan. 1, 1929), pp. 859-865, XP002765992.
S. M. McElvain et al: "Ethane-1,2- and Propane-1,3-disulfonic Acids and Anhydrides", Journal of the American Chemical Society, vol. 67, No. 9, Sep. 1, 1945 (Sep. 1, 1945), pp. 1578-1581, XP055226644, US.
Keith E. Gutowski et al: "Prediction of the Formation and Stabilities of Energetic Salts and Ionic Liquids Based on ab Initio Electronic Structure Calculations", Journal of Physical Chemistry Part B: Condensed Matter, Materials, Surfaces, Interfaces & Biophysical, vol. 109, No. 49, Dec. 1, 2005 (Dec. 1, 2005), pp. 23196-23208, XP055473736, US.
Supplementary European Search Report dated May 22, 2018 for European Application No. 15 85 7333.

*Primary Examiner* — Terressa Boykin
(74) *Attorney, Agent, or Firm* — Seppo Laine Oy

(57) ABSTRACT

Described herein is a feasible, significantly simplified production method that avoids challenging lactonization steps and converts a low molecular weight aliphatic polyester, consisting of hydroxy acids and a comonomer, whose molecular weight has been increased by step-growth polymerization reactions. The molecular weight of the aliphatic polyester, based on comparison of initial and final weight average molecular weights ($M_{w,1}/M_{w,2}$), increased significantly at a rate which permits the use of reactive extrusion to produce high molecular weight aliphatic polyesters in a simple, economically feasible manner.

19 Claims, 2 Drawing Sheets

METHOD OF PRODUCING GLYCOLIC ACID POLYMERS

FIELD OF INVENTION

The present invention relates to polyesters with improved thermal properties. In particular, the present invention concerns the synthesis difunctional aliphatic polyesters, which may exhibit a low molecular weight limiting their use in practise, conversion of such polymers to a higher molecular weight polymeric material and production methods thereof leading to products derived mainly from hydroxy acids, partially, but not exclusively, from glycolic acid.

DESCRIPTION OF RELATED ART

Polyglycolic acid, prepared from the smallest member of the α-hydroxy acid family, has been produced and copolymerized by condensation polymerization processes for decades. (cf. U.S. Pat. No. 2,676,945, U.S. Pat. No. 2,683,136).

Aliphatic polyesters, including polyglycolic acid and polylactic acid, are biodegradable materials as these are degraded through hydrolysis and/or through microbial or enzymatic pathways. The biodegradability and biocompatibility make these useful in many applications. Poly(α-hydroxy acid)s have been under research for medical devices as surgical sutures and artificial skins since the 1960s, where one area of interest has been on polyglycolic acid (Vert, M. et. al., *Makromol Chem Suppl* 1981, 5, 30-41). Beyond medical applications polyglycolic acid has been proposed as a barrier material for containers (U.S. Pat. No. 4,424,242, U.S. Pat. No. 4,565,851). Later in 1988 polyglycolic acid copolymers have been applied also for packaging applications (cf. U.S. Pat. No. 4,729,927).

A common disadvantage of conventional condensation polymerization is that a polymer exhibiting a low molar mass is typically formed in the process. The low molecular weight prevents the polymer to achieve sufficiently good properties to be useful in a myriad of applications. Similar methods to produce polyglycolic acid are polycondensation of an alkyl glycolate and desalting polycondensation of a glycolic acid salt. Equivalent reactions can be used for lactic acid, albeit with a frequent disadvantage where the desired optical purity of the precursor is lost due to racemization during the polycondensation reactions.

As known by those familiar with the art, higher molecular weight materials with subsequently improved properties can be obtained by ring-opening polymerization of the equivalent lactone or cyclic ester. Improvements to these processes have similarly a long history (GB 825,335, U.S. Pat. No. 3,442,871). However, the preparation of pure glycolide which yields high molecular weight polyglycolic acid is difficult to achieve. For example, preparation of pure glycolide has been described in 1987 (cf. U.S. Pat. No. 4,650,851). Numerous process improvements have been reported (cf. U.S. Pat. No. 5,223,630; U.S. Pat. No. 7,235,673). Processes to prepare lactide, a closely related molecule, result in poor collected yields of glycolide and high amounts of undesired side products which make the glycolide forming process a bottleneck for wider use of the material. Thus, preparation of glycolide in high yields requires the use of solvents and additives which must be separated from the product and present a technical obstacle for wider use of the materials.

Utilization of step growth copolymerization with for example diisocyanates is a well-known technology to extend the molecular weight of suitable prepolymers. Step-growth methods have been used for lactic acid based materials (U.S. Pat. No. 5,380,813) with a clear disadvantage as the optically pure precursor undergoes racemization during the condensation process losing its crystallinity, thus severely limiting its applicability due to a low glass transition temperature as the sole thermal transition for the material. Further, during synthesis, depolymerisation to the corresponding lactones may take place which causes a drop in the yield of the aimed product.

Thus, based on the currently available techniques, limited solutions are available where it is possible to prepare polymers consisting of hydroxyacids, in particular polyglycolic acid, through condensation polymerization which exhibit high molecular weight and thermal stability which also are free from discoloration and loss of material during manufacturing. The same is true for telechelic polymers prepared from hydroxy acids which exhibit the desired functionality at least above 95% and hence are most suitable for step growth polymerizations.

SUMMARY OF THE INVENTION

It is an object of this invention to provide a method to produce telechelic homo- or copolymers having properties of thermal stability, said telechelic copymers consisting of polyglycolic acid segments that exhibits properties making it useful in applications including, but not limited to, packaging of various articles or fluids, as a barrier material or in medical applications as implantable material or drug delivery vehicle.

A second object of this invention is to provide material compositions consisting of polyglycolic acid segments that are able to form crystalline structures after a step-growth molecular weight extension step.

It is a third objective of this invention to provide methods and catalysts to prepare a suitable α,ω-difunctional polyglycolic acid polymer prepared by but not limited to a condensation process which can be efficiently utilized in step-growth polymerizations to increase its molecular weight where the α,ω-difunctional polyglycolic acid polymer exhibits high thermal stability.

A fourth objective is to provide suitable comonomers for the step-growth polymerization or chain extension of the described polyglycolic acid polymer.

One more object of this invention is to carry out the step-growth copolymerization for molecular weight increase in such a manner that the weight percentage of the polyglycolic acid segments is as high as possible in order to retain its useful properties.

A further object is to avoid glycolide as an intermediate for the polymer through preparation of telechelic hydroxy-terminated prepolymers of glycolic acid by a condensation process, and which can be applied by useful methods, and processes to polymerize hydroxyacid monomers to high molar weight polymers which can be converted to applications.

Still a further objective is to extend the use of the synthetic procedure to produce high molecular weight polyglycolic acid through a condensation polymerization in high yields, where the formed polymer exhibits high thermal stability.

Objects of the present invention are also to use said materials as films, sheets, fibers, powders or molded articles in applications.

These and other objects, which jointly with existing materials and methods are achieved in the present description are described and claimed herein.

The present invention is based on the formation of a polyglycolic acid polymer, or copolymer, by condensation reactions in the presence of a sulfonic acid catalyst to increase its molecular weight or to achieve desired telechelic polymers and to provide a thermally stable polymer (homopolymer or copolymer). By a subsequent step-growth polymerization step of a polyglycolic acid polymer, or optionally copolymer, molecular weights which are difficult to achieve for polyglycolic acid, particularly by condensation processes, can be achieved, as known for those familiar to the art. In particular, significant benefits are achieved when said polyglycolic acid polymer has been prepared by a condensation process thus avoiding the cumbersome synthesis of glycolide and its subsequent ring-opening polymerization. Further, with the present invention one is able to obtain a discoloration free product without a significant loss in yield during prolonged reaction times.

Particularly preferred compositions of the polyglycolic acid polymer and copolymer include, in addition to glycolic acid:
one or more organic molecule, linear, branched, cyclic, aromatic or polymeric containing two or more hydroxy, carboxylic acid, or thiol groups
a hydroxy acid comonomer, or its equivalent lactone, of general formula

HO(CH$_2$)$_n$CHR(CH$_2$)$_m$COOH wherein
R is independently selected from a group consisting of hydrogen, linear alkyl, alkenyl alkynyl, branched alkyl, cyclic alkyl and aryl moieties, and
n and m are integers which can independently vary between 0 and 20

Preferred classes of the chemicals that can be used to increase the molecular weight of the polyglycolic acid polymer and copolymer include: diisocyanates, bisepoxy compounds, dialdehydes, diimines, diketenes, phosphoric acid esters and bisoxazolines. Particularly preferred classes are diisocyanates and bisepoxy compounds.

Polymerization is carried out in the presence of catalytically active amounts of sulfonic acid(s) which have low volatility at the reaction temperatures.

The thermal stability of the polymers and copolymers thus produced are good—the high molecular weight polymers typically exhibit a glass transition point in excess of 35° C., in particular 37° C. and even up to 50° C., and decomposition temperatures, T$_{d\ 10\%}$ of at least 280° C., in particular at least 295° C.

More specifically, the present method according to the present invention for producing polymers is characterized by what is stated in the characterizing part of claim 1.

The novel polymers are characterized by what is stated in claims 22 and 23, and the novel uses by what is stated in claim 24.

Considerable advantages are obtained by the present invention. The present invention provides for controlled preparation of polyglycolic acid polymers by condensation polymerization in a first step, optionally in combination with an increase in molecular weight in a second step, which preferably is being carried out after the first step. The second step is preferably a step in which the polymer length and molecular weight is increased by bulk polymerization. Finally, it is possible to even further increase the molecular weight by using chemicals that extend the polymer chains to longer units yielding high molar mass linear or optionally branched polymers.

These polymers retain melting transitions and hence also find use in higher temperature applications. Thus, various embodiments of the invention are useful for producing polyglycolic acid based materials with high molecular weights.

Compared to polyglycolic acid polymers prepared by the use of tin catalysts, such as tin octoate, the present technology provides polymers having a degradation temperature which is considerably much higher, e.g. 40 to 50° C. higher. As a result, the polymers have excellent thermal stability as evidenced by TGA analysis which shows that the TGA 10% degradation temperature are on the order of 290 to 350° C. This result is remarkable since it can be achieved without the use of glycolide monomer chemistry. Another remarkable feature of this invention is that the loss of material due to depolymerisation to the corresponding lactone is significantly lower.

Lactic acid is optically active, and condensation polymerization typically leads to racemization of the optically pure monomers. As a result, corresponding polymers (PLAs) are not crystalline and their use is limited. The present glycolic acid polymers are not impaired by such features and they exhibit high melting points and decomposition points.

The polymers obtained can be used as such or in blends with other polymers in a range of applications.

Next, the invention will be examined more closely with the aid of detailed description with reference to the appended drawings.

DETAILED DESCRIPTION OF PREFERRED EMBODIMENTS

Figure 1:
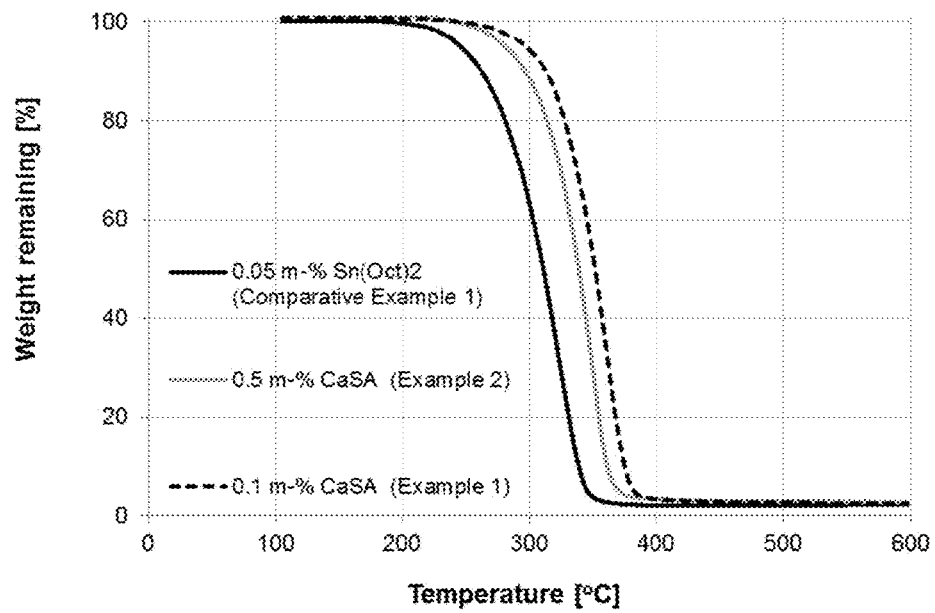
FIG. 1 shows the TGA of Comparative Example 1 and of Examples 1 and 2.

Described herein is a feasible, significantly simplified production method that avoids challenging lactonization steps and converts a low molecular weight aliphatic polyester, consisting of hydroxy acids and a comonomer, to a polymer whose molecular weight has been increased by step-growth polymerization reactions. In particular, the method provides a means to obtain aliphatic polyesters and their copolymers which exhibit high thermal stability.

The method comprises providing a difunctional monomer; subjecting said glycolic acid to condensation polymerization in the presence of the monomer and preferably a catalyst; and continuing polymerization to provide a polymeric chain formed by residues derived from glycolic acid and said difunctional monomer. Preferably, in particular when carrying out condensation polymerization in the presence of an esterification catalyst, water formed during condensation polymerization is continuously removed.

The molecular weight of the aliphatic polyester, based on comparison of initial and final weight average molecular weights ($M_{w,1}/M_{w,2}$), increased significantly at a rate which permits the use of reactive extrusion to produce high molecular weight aliphatic polyesters in a simple, technically and economically feasible manner.

In one embodiment, the present technology provides for telechelic polymers of glycolic acid. The term "telechelic" is used for indicating that the present polymers or prepolymers are capable of being subjected to polymerization through their reactive end-groups. The end groups typically exhibit the same (chemical) functionality.

The polymers of the present kind are capable of being used as prepolymers. Such polymers comprise at least 5, for example 5 to 250, preferably 6 to 100, in particular 10 to 50 residues of glycolic acid. However, equally, it is possible to produce high molecular polymers having from more than 50 residues of glycolic acid, in particular more than 100, for example more than 250 and suitable more than 500 glycolic acid units.

The polymers comprise in one preferred embodiment essentially linear polymeric chains. In another preferred embodiment, the prepolymers comprise a branched polymeric chain.

As will be discussed in more detail below, in a preferred embodiment, the present polymers have a degree of crystallinity of at least 20%, preferably at least 30%, in particular at least 40% of the crystallinity or melting enthalpy of the prepolymer.

Further, the present polymers comprise typically at least 80 mol-%, preferably at least 90 mol-%, of residues derived from glycolic acid.

To reach the aim of providing a telechelic polymer, the polymer according to the present technology suitably comprises 0.1 to 20 mol-%, preferably 0.5 to 10 mol-%, more preferably 1 to 5 mol-%, of residues derived from a suitably terminated, e.g. a difunctional, comonomer, typically a hydroxy-terminated comonomer.

In a particularly interesting embodiment, the molar ratio between residues derived from glycolic acid and residues derived from a comonomer is 1000:1 or less, for example 500:1 or less, suitably 300:1 or less, advantageously 45:1 to 55:1, in particular 48:1 to 52:1.

In one embodiment, the comonomers are selected exclusively from comonomers which are hydroxy-terminated comonomers (diols, triols, tetraols, pentaols), such as propanediol, butanediol, hexanediol, pentaerythriol and oligomeric polyethylene glycol and combinations thereof, to produce a hydroxy-terminated telechelic polymer.

In another embodiment, at least a part of the comonomers (optionally in combination with any of the above, in particular diols) is selected from the group of dicarboxylic acid, and dithiol, and mixtures thereof.

Formula I shows an example of a telechelic, hydroxyl-terminated glycolic acid polymer of the instant kind. In the formula m and n are integers which stand for a value of 1 to 100.

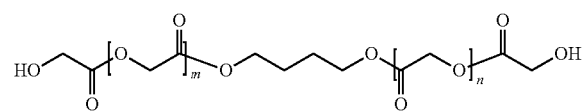

Various features of the synthesis of the polyhydroxy acid polymers according to the present technology will be examined in the following.

It has been found that polyhydroxy acid polymers, in particular prepolymers of a kind consisting to a high degree of polyglycolic acid, are suitable for a subsequent step growth polymerization process which extends the molecular weight of the resultant material to levels which are required for its acceptable use in applications.

The polyhydroxy acid polymer can be obtained as a product of condensation polymerization of glycolic acid, optionally one or more hydroxy acid, or the corresponding lactone, as a comonomer, and one or more suitable α,ω-difunctional compound.

In one embodiment, the step of preparing a hydroxyl-terminated telechelic polymer of glycolic acid, comprises the steps of
  providing glycolic acid;
  providing a hydroxy-terminated monomer;
  subjecting the glycolic acid to condensation polymerization in the presence of an esterification catalyst, selected from sulfonic acids, and the hydroxy-terminated monomer;
  continuously removing water formed during condensation polymerization; and
  continuing polymerization to provide a polymeric chain formed by residues derived from glycolic acid and the hydroxy-terminated monomer.

The esterification catalyst is an organic compound, more specifically a sulfonic acid.

According to the present technology, polyglycolic acid is polymerized and processed at relatively high temperatures. When polyglycolic acid is polymerized through polycondensation, a relatively high concentration of the catalyst is needed. However, conventional catalysts, such as inorganic compounds or organometal compounds, frequently induce side reactions during processing and polymerization, such as transesterification and formation of glycolide. By contrast, the present catalyst enable preparation of thermally stable polyglycolide by condensation polymerization in melt and bulk phase.

The temperatures employed during melt-phase and bulk polymerization of glycolic acid is in the range of 150 to 200° C., the catalysts employed are organic sulfonic acids which do not readily evaporate during polymerization conditions. In practice, this means that the boiling of the catalyst is higher than about 250° C. at normal pressure, in particular 300° C. or higher.

The amount of the catalyst is preferably from 0.001 to 0.5% by weight of the glycolic acid together with the comonomers.

A solid-phase polymerization method of high-molecular weight aliphatic polyester wherein the solid-phase polymerization of an aliphatic polyester prepolymer is conducted under a gas stream containing sulfonic acid catalyst is disclosed in US20140100350. Various catalysts are further suggested in US 2006217523, US 2009176963, US 2011065871 and US 2012027973.

None of the references disclose and exemplify a method of the present kind, wherein glycolic acid homopolymerized or copolymerized at relatively high temperatures to give prepolymers, in particular prepolymers containing terminal OH groups which allows for further coupling reactions to produce polymers.

The known methods achieve polymerization in a two-step process wherein melt-polymerization which gives a prepolymer is followed by a gas phase stage for producing a high molecular weight polymer. By contrast, in the present technology polymerization is followed by a bulk polymerization step which yields the aimed high-molecular weight polymer by a step polymerization reaction sequence optionally followed by coupling reactions of the prepolymers.

In one embodiment, the present invention provides linear prepolymers, rather than cross-linked prepolymers. Processing a linear material is much more facile and gives a broader range of applications. Furthermore, processing of the present prepolymers is possible by thermoplastic methods, which is not possible when producing cross-linked prepolymers.

The present sulfonic acids are particularly suitable for producing polyglycolic acids at yields exceeding 90% and a degree of desired end-terminal groups exceeding similarly 90%. More preferably, the yield and the degree of desired end-terminal groups exceed 95%.

However, the present sulfonic acids are also particularly suitable for producing polyglycolic acids having a weight average molecular weight of more than 20,000 at a yield in excess of 75% when no comonomers are used to restrict segmental growth of the polyglycolic acid.

According to one preferred embodiment, the content of the glycolic acid in the polyhydroxy acid polymer is so high that the condensated segments of the glycolic acid repeating units are able to form crystals in the polyhydroxy acid polymer and in the subsequent polymer formed after a step growth polymerization process. Hence, it is preferred that the glycolic acid weight ratio to the total weight of monomers is, at the start of the polymerization, at least more than 50%, preferably more than 70% and most preferably more than 90%.

Another hydroxy acid, or the corresponding lactone thereof, may be used in a preferred composition as a comonomer to adjust the properties of the polyhydroxy acid polymer.

Such hydroxy acids have the general formula

HO(CH$_2$)$_n$CHR(CH$_2$)$_m$COOH wherein
R is independently selected from a group consisting of hydrogen, linear alkyl, linear alkenyl linear alkynyl, branched alkyl, cyclic alkyl, cyclic alkenyl, aromatic (consisting of 1-6 rings) and alkylaromatic (consisting of 1-6 rings) moieties; and
n and m are integers which can vary between 0 and 20.

Examples of hydroxy acid comonomers include lactic acid, 3-hydroxypropionic acid, 2-hydroxybutanoic acid, 3-hydroxybutanoic acid, 4-hydroxybutanoic acid, 5-hydroxypentanoic acid, 6-hydroxyhexanoic acid, and benzoic acid.

According to another preferred embodiment of the invention the weight ratio of added hydroxy acid comonomers is less than 30%, more preferably less than 20% and most preferable less than 10%.

Suitable α,ω-difunctional compounds are used to generate polyhydroxy acid compositions which in turn yield and a suitable α,ω-difunctional polyhydroxy acid materials. The ability to form α,ω-difunctional polyhydroxy acid materials is critical to achieve successful increase in molecular weight in the subsequent step growth polymerization step. In the examples below it is demonstrated that having a high degree of α,ω-difunctionality in the polyhydroxy acid materials has a direct impact on the success of the step growth polymerization step.

One more preferred embodiment is that no comonomers are used to permit the molecular weight growth to achieve its maximum with minimal yield losses due to formation and evaporation of glycolide.

The catalyst is composed of compounds bearing sulfonic acid groups. In one embodiment, the catalyst comprises an organic sulfonic acid compound having a boiling point of more than 275° C., in particular higher than 300° C., for example higher than 325° C., suitably 350° C. or even higher (up to, e.g., 440° C., although this is no absolute maximum). The sulfonic acid comprises an organic residue having at least 10 carbon atoms. Alicyclic residues comprising 1 to 3 alicyclic rings, optionally carrying one or more substituents, are particularly preferred Such substituents can be selected from the group of halogen atoms, oxygen and nitrogen containing radicals, such as oxo or nitro groups or combinations thereof, and alkyl, alkenyl and alkynyl substituents having 1 to 6 carbon atoms. The alicyclic rings may as such have 5 to 24 ring members and they may contain ring atoms selected from heteroatoms, such as oxygen, nitrogen and sulphur.

Camphor sulfonic acid is an example of a particularly preferred catalyst. Camphor sulfonic acid contains a 10 carbon residue (a bicyclic aliphatic structure) which exhibits an oxo substituent. It has a boiling point of about 375° C.

To the extent that optical isomers are present, the catalyst can be used in the form of enantiomerically pure isomers or as a racemate.

The properties and molecular weight of α,ω-difunctional polyhydroxy acid material can be adjusted based on the ratio of the hydroxy acid and the α,ω-difunctional compound. The amount of the α,ω-difunctional compound will directly impact on the resultant molecular weight of the material. An increased use of α,ω-difunctional compounds results in a decreased molecular weight of the resultant α,ω-difunctional polyhydroxy acid material. Also, the properties of α,ω-difunctional compound will have an impact on the resultant α,ω-difunctional polyhydroxy material. For instance, the use of a polymeric α,ω-terminated material in the condensation process will yield a copolymer with unique properties. According to a further preferred embodiment of the invention, the content of the added α,ω-difunctional compounds is less than 20%, preferably less than 15% and most preferably less than 10%.

As noted above, such an organic added α,ω-difunctional compound may be linear, branched, cyclic, aromatic or polymeric containing hydroxy, carboxylic acid, thio or amino groups. Examples of such compounds are diols, dicarboxylic acids and their anhydrides, diamines and polymeric materials having α,ω-difunctionality, wherein the functionality is a dihydroxy, diacid, or dithio.

Examples of such classes of compounds are ethylene glycol, 1,3-propanediol, 1,4-butanediol, 1,5-pentanediol, 1,6-hexanediol, 1,7-heptanediol, 1,8-octanediol, 1,9-nonanediol, 1,10-decanediol, 1,2-propanediol, 1,2-butanediol, 2,3-butanediol, 1,3-butanediol, 1,2-pentanediol, neopentyl glycol, equivalent thiols, oxalic acid, malonic acid, maleic acid, maleic anhydride itaconic acid, succinic acid, succinic anhydride, glutaric acid, adipic acid, pimelic acid, suberic acid, azelaic acid, sebacic acid, telechelic polyethylene glycol, telechelic polypropylene glycol, polytetramethyl ethylene glycol.

These examples are not exclusive and can be complemented with related compounds, linear or branched as well as cyclic or aromatic and derivatives thereof.

In a further preferred embodiment, the present invention also permits the preparation of ω-multiterminated polyhydroxy acids. Such materials are obtained when the α,ω-difunctional compounds is replaced by an equivalent having three or more similar, or dissimilar functionalities permit the preparation of ω-multiterminated polyhydroxy acids which under step growth conditions yield thermosetting materials as known for those familiar to the art. Particularly preferred are compounds having three or more similar functionalities. Unambiguous examples of such compounds are glycerol, pentaerytritol, trimethylol propane and the like.

One further embodiment of this invention is the production process how to obtain α,ω-difunctional polyhydroxy acid materials. Polyglycolic acid as a homopolymer has a melting transition above 210-220° C., which necessitates high reaction temperatures if one wants to conduct the polymerization process in a molten state.

Basically, this may require that the reaction media be heated to 230-250° C., which under prolonged times lead to darkening of the material, in particular if oxygen is present. A discolored product is of disadvantage in consumer applications when optically attractive materials are preferred and hence yellowish or even brown-like materials are unfavourable.

It has surprisingly been found that the melt condensation polymerisation of glycolic acid can be performed at temperatures below the melting point of the product polyglycolic acid (which is typically 210-220° C., as mentioned above). The polycondensation temperature is gradually increased and the absolute pressure decreased during the typical melt polycondensation stage.

It is beneficial to avoid too high polymerisation temperatures that easily generate unwanted brown colour for the polymer.

Thus, according to a preferred embodiment of the present technology α,ω-difunctional polyhydroxy acid materials can be obtained by a process where the condensation polymerization is carried out sequentially first in the molten state and then followed by a condensation process that takes place in a solid state at 200° C. or less for a prolonged period of time. The use of lower polymerization temperatures in the solid-state polymerization does not substantially affect the colour of the material. Prolonged polymerization times at high temperatures will cause undesired yellowing or darkening of the product.

The solid state polymerization may optionally be followed by a final step at 240° C. or higher for a shortest possible time to obtain a freely flowing product that can be easily handled and transferred. Reduced pressure is beneficial for the progress of the condensation polymerisation during all the steps, and in the later stages of polymerisation high vacuum can be applied (below 50 mbar absolute pressure). A preferred time for the first melt polymerization is 36 h or less and 24 h or less for the solid polymerization prior to the final dehydration, and condensation process. A further method to increase the content of the α,ω-difunctional polyhydroxy acid materials is to increase the content of the α,ω-difunctional comonomer in the feed, which increases the probability of obtaining a α,ω-difunctional polyhydroxy acid material.

In a particularly preferred embodiment, the polymerisation temperatures at the end of the melt stage polycondensation are 180-220° C., preferably 190-210° C. Typically, operation at these temperature ranges is possible after 6 to 10 h from the beginning of the polycondensation stage.

The instant embodiment also makes it possible to produce the telechelic prepolymer with high enough molecular weight and uniform enough end group functionalization without solid state polymerisation stage.

Another method to produce the α,ω-difunctional polyhydroxy acid materials, as known for those familiar to the art, is the process in a solvent where the said solvent is capable of dissolving the polymer that is formed and simultaneously assist in removal of the condensation product by azeotropic distillation or the like. Examples of such solvents are dimethylformamide, dimethylacetamide, diphenyl ether and dimethylsulphoxide.

In the above discussed embodiments, the monomers and the difunctional compound can be added simultaneously or sequentially. In one embodiment, glycolic acid monomers are first subjected to condensation polymerization, optionally together with comonomers, to provide oligomers (comprising 2 to 8 units) and only then difunctional compound is added.

In another embodiment, glycolic acid is first condensation polymerized, the comonomer is added, and polymerization is continued. Finally difunctional compound is added and polymerization is continued. In a third embodiment, glycolic acid monomers are first condensation polymerized, then difunctional compound is added and polymerization is continued. Last, comonomer is added and polymerization is continued.

In one more embodiment the temperature for the melt polymerization can be adjusted by the amount of α,ω-difunctional comonomer. Typically, increased concentrations of the α,ω-difunctional comonomer result in a decreased melting temperature for the α,ω-difunctional polyhydroxy acid material, which permit the use of decreased polymerization times and hence may impart in the desired appearance of the product.

As will be discussed below (cf. Example 15), glycolic acid polymers, for example produced by a method according to the present invention, exhibit properties of elongation in combination with high modulus (i.e. high strength properties). Such materials are particularly useful in biaxial orientation or thermoforming applications because they will yield layers that are not prone to having discontinuities. Such polymers typically exhibit a molecular ratio between the prepolymer and the coupling agent, e.g. a diisocyanate, amounting to 1:0.9 to 1:1.3, in particular 1:1 to 1:1.1.

Molecular Weight Increase of the Polyhydroxy Acid by Step Growth Polymerization

In studies it has been found that the degree of α,ω-difunctionality should be considered when the outcome of the step growth polymerization is evaluated. For successful use in application, it has been determined that the weight average molecular weight ($M_w$) of the material should exceed 50,000 g/mol as determined by SEC. If the Mw is lower than this, the material is unable to form continuous articles, such as thin films, which are useful in packaging applications. This can be easily tested as solvent castings from HFIP by monitoring whether continuous films can be achieved or if the film forms cracks during drying. Based on this it has been concluded that the Mw should at minimum double its value during the step growth polymerization.

Figure 4:
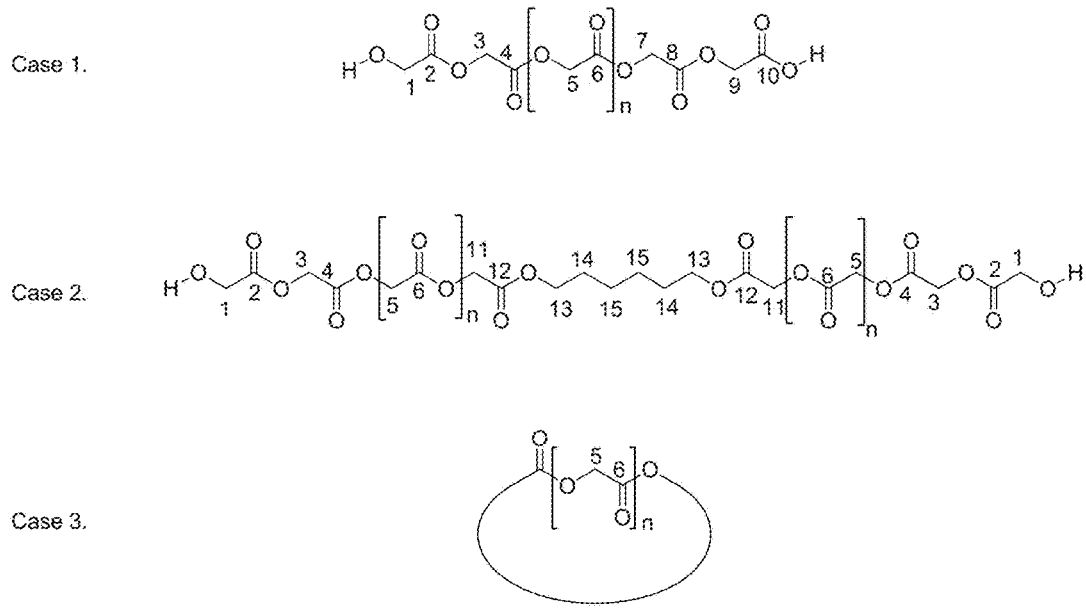
FIG. 4 shows three plausible polymer structures for a polymer prepared by condensation polymerization of glycolic acid and a difunctional comonomer (e.g. hexanediol): Case 1—OH/COOH-terminated polymer chain, Case 2—α, ω-OH-terminated polymer chain, and Case 3—macrocyclic polymer chain with no terminating group(s).

In the production of the present α,ω-difunctional polyhydroxy acid materials, three types of materials can theoretically be obtained. This is depicted in FIG. 4 as a result of a condensation polymerization of glycolic acid and 1,6-hexanediol. If the α,ω-difunctional compound is present in the polymer molecule, an α,ω-difunctional polyhydroxy acid material is obtained. However, if an α,ω-difunctional is not included in all polymer molecules, a material exhibiting both carboxylic acid and hydroxy functions are present in addition to the α,ω-difunctional polyhydroxy acid material. As the third possible structure is a macrocycle which is formed when the carboxylic acid and hydroxy functions of a polymer molecule intramolecularly react.

As known for those familiar to the art, either carboxylic or hydroxy functions can react with noted comonomers used for the step-growth molecular weight increase step. In some cases a comonomer may be able to react with both carboxylic and hydroxy functions. For instance, the reaction with a hydroxy group and an isocyanate yields a carbamate, or urethane, structure while the reaction with a carboxylic acid and an isocyanate yields an amide structure with carbon dioxide as a by-product. However, as can be seen from FIG. 1, the OH/COOH ratio of terminal groups, or the degree of α,ω-difunctionality, has a profound impact on the result of the step growth polymerization. Hence to achieve a sufficient molecular weight increase, in one further embodiment of this invention the degree of the α,ω-difunctionality is more than 60%, preferably more than 70% and most preferably more than 80%, when the degree of α,ω-difunctionality is determined from a quantitative $^{13}C$ NMR spectra.

The difunctionality is calculated from the ratios of OH and COOH terminal polymer chain as follows based on three plausible polymer structures that can be formed in the condensation polymerization process of a copolymer of an exemplary diol, 1,6-hexanediol, and glycolic acid (cases 1 to 3).

In the first case there is no hexanediol in the polymer chain and therefore it is OH/COOH-terminated. A COOH-terminated end group gives characteristic peaks in the 13C NMR at ~170.2 ppm and ~60.7 ppm (carbons 10 and 9). Other assigned signals are the repeating unit at ~168.0 and ~60.9 ppm (carbons 5 and 6) OH-end group at ~172.8 ppm and ~59.9 ppm (carbons 1 and 2), and the glycolic acid unit next to the end-group at 168.7 and other signal possibly overlapping with repeating unit (carbons 3 and 4).

In the second case there is one hexanediol unit most likely in the middle of the chain.

Hexanediol unit gives characteristic signals at ~66.8 ppm, ~27.7 and ~24.8 ppm (carbons 13,14 and 15), and the glycolic acid monomers next to hexanediol unit give signals at ~169.3 and ~61.3 ppm (carbons 11 and 12).

In the third case it is assumed that the repeating unit is the same in the whole cyclic structure and therefore it gives one signal in carbonyl region and one signal in aliphatic region. The signals are most likely fused into the signals of the repeating units at ~168.0 and ~59.8 ppm (carbons 5 and 6), and therefore it might increase the value of calculated number average molecular weight (Mn).

Number average molecular masses were calculated from integrals obtained from spectra as follows:

$$M_n = \frac{\Sigma n M_n}{\Sigma n} = \frac{n_{OH/OH} M_{OH/OH} + n_{OH/COOH} M_{OH/COOH}}{n_{OH/OH} + n_{OH/COOH}} \quad (1)$$

$$n_{OH/OH} = A_{21\ ppm} = 1 \quad (2)$$

$$n_{OH/COOH} = A_{170.1\ ppm} \quad (3)$$

$$M_{n,OH/OH} = \left(\frac{A_{RU}}{\Sigma n} + 4\right) M_{RU} + M_{diol} \quad (4)$$

$$M_{n,OH/COOH} = \left(\frac{A_{RU}}{\Sigma n} + 3\right) M_{RU} \quad (5)$$

As noted above, preferred classes of the chemicals that can be used to increase the molecular weight of the polyglycolic acid polymer and copolymer in a step growth polymerization process include: diisocyanates, bisepoxy compounds, dialdehydes, diketenes, phosphoric acid derivatives and bisoxazolines.

Examples of these are alkyl diisocyanates, such as butane diisocyanate, hexamethylene diisocyanate, aromatic isocyanates such as tolylene-2,4-di-isocyanate, tolylene-2,5-diisocyanate, tolylene-2,6-diisocyanate, 1,4-phenylene diisocyanate, 1,3-phenylene diisocyanate, m-xylylene diisocyanate, poly(hexamethylene diisocyanate.

Examples of bis-epoxy function compounds are aliphatic, aromatic and polymeric diglycidyl ethers, such as ethylene glycol diglycidyl ether, propylene glycol diglycidyl ether, neopentyl glycol diglycidyl ether, bisphenol A diglycidyl ether, and polyethylene glycol diglycidyl ether.

Examples of phosphoric acid esters are trimethylphosphate, triphenylphosphate fatty acid phosphates (e.g. stearyl phosphates), and 2,6-di-tert-butyl-4-methylphenyl phosphite.

According to present invention the compounds used in the step growth polymerization step are chosen in such a way that the molecular weight increase step can be carried out in a twin screw extruder. Analysis has shown that appropriate manufacturing of α,ω-difunctional polyhydroxy acid material combined with step growth polymerization comonomer results in rapid completion of the reaction under conditions of twin screw extrusion (FIG. 7). Hence in an embodiment of the present technology the step growth polymerization step can be completed in less than 30 minutes, preferably less than 10 minutes and most preferably in less than 5 minutes.

The obtained telechelic material from the condensation process can be fed into the extruder by appropriate hoppers as known for those familiar to the art. It is preferable that the hopper has a moisture free atmosphere in order to prevent undesired hydrolysis to take place. The telechelic prepolymers can be grinded or prepared with suitable equipment to a grain size that can be easily handled by the hopper feed mechanism. The extruder configuration will preferably be such that it consists of four or more segments. The first segment is set up by screw configuration and temperatures so that the telechelic prepolymer melts. The second segment consists of an inlet for addition of the comonomer used for the step-growth polymerization, temperatures that permit to keep the material flowing in the segment and a screw configuration suitable for efficient mixing of the telechelic polymer and the step-growth prepolymers. The third segment consists of an inlet for addition of suitable additives for stabilizing additives, temperatures that permit to keep the material flowing in the segment and a screw configuration suitable for efficient mixing of the formed copolymer. An exhaust to remove potentially gaseous products also can be included in the third segment, or in a separate segment. Other segments may be added according to need if more additions or exhausts are required. The final segment consists of a screw configuration that will permit the material to efficiently exit the extruder die. The preferred temperatures for the segments used in the step growth polymerization in an extruder are 215-280° C., more preferably 220-250° C. or most preferable 220-240° C.

For convenient addition of the comonomer used in the step-growth polymerization of the telechelic prepolymers, it is preferred that such comonomers are in liquid form so they can be added to the extruder by pumps. Hence, comonomers that are solids at room temperature can be dissolved in suitable solvents which do not interfere with the step-growth polymerization reaction and can be easily evaporated in the third segment of the step-growth process. Suitable solvents are polar or apolar solvents such as THF, DMSO, alkanes, toluene, dichloromethane. Protic solvents such as alcohols are not preferred.

For those familiar to the art, the amount and type of the comonomer used for the step growth polymerization will have a profound impact on the product properties. For instance, when using diisocyanates as comonomers, the obtained material may lack sufficient properties if too little of the diisocyanate is used. Similarly, the obtained material may be crosslinked if an extensive amount of the diisocyanate comonomer is used. While theories of step-growth polymerization teach that optimal amount of the reactive comonomers is in an equimolar amount, it may be beneficial to deviate from this according to need. For instance a slight excess of diisocyanate may yield a polymer which possesses long-chain branching in a suitable amount that can have a beneficial effect on the melt viscosity and processability of the polymer.

Further to retain the useful properties of polyglycolic acid, it is important to choose the comonomers in such a way that crystallinity is preserved in the material. Under conditions described herein, such materials are formed.

For the sake of completeness it should be noted out that it is also possible carry out the step growth polymerization step with prepolymers obtained by ring opening polymerization of corresponding lactones (glycolides), although the present condensation polymerization of monomers is preferred.

Various other materials or additives can be mixed into the material during or after the step-growth polymerization process. Such materials may be polymers to yield blends, fillers and reinforcing fibres such as silica or $CaCO_3$, plasticizers, stabilizers against light, thermally or hydrolytically induced degradation, glass fibres or lignocellulosic fibres.

The polymer produced can be formed using known processing methods for thermoplastic or solution formable polymers. Examples are extrusion to films, sheets, profiles, pipes or fibres; solvent casting or fibre spinning from solution. Moulded articles can be produced e.g. by injection moulding, blow moulding or thermoforming. The polymer can be applied as single layer material or as laminates or multi-layer structures.

The method described herein permits production of material which is thermally stable and largely free of discoloration. A further benefit is that the step-growth copolymerization of a polyglycolic acid polymer of suitable molecular weight with a comonomer, such as various diisocyanates, yields a material which retains many useful properties of the polyglycolic acid.

Particularly useful is the fact that such step-growth copolymerization introduces additional properties such as improved elongation which are useful for instance in packaging applications where one or two dimensional orientation is applied to the material or a multilayer structure where the copolymer is one component. This approach permits preparation of copolymers exhibiting elongations at break higher than 100% while similar materials prepared by ring-opening polymerization of to yield polyglycolic acid exhibits an elongation at break less than 20%.

It should finally be pointed out that although bulk polymerization is described below in more detail, it is also possible to carry out the polymerization steps as solution polymerization and emulsion polymerization.

EXAMPLES

Characterization of Materials

Molecular weights and molecular weight distributions were determined with size exclusion chromatography (SEC). A Waters system equipped with two 7.8 mm×300 mm Styragel HR 4E and HR 5E columns and Waters 2414 Refractive Index Detector connected in series was used. Hexafluoroisopropanol (HFIP, 5 mM $CF_3COONa$) was used as an eluent and was delivered at a rate of 1.0 ml/min. The results were calculated against monodisperse polymethylmethacrylate standards.

Differential scanning calorimetry (DSC) was used to determine thermal transitions of the prepared polymers using Mettler Toledo DSC820 STARe SW 9.20 instrument under nitrogen atmosphere. Samples were heated twice from 0 to 240° C. at a rate of 10° C./min. During the first cooling scan, 0.5 h annealing period was added at 120° C./min. Thermal transitions were recorded from the second heating scan.

The TGA measurements were conducted with Netzsch STA449 F1 equipment. The sample was first kept at constant temperature at 105° C. for 30 min to dry the sample. After the drying sequence, the sample was heated from 105° C. to 600° C. at a rate of 10° C./min. Nitrogen flow of 40 ml/min was used during the whole run.

The microstructure of polymers was analysed by $^1H$ NMR and $^{13}C$ NMR using a Bruker 500 MHz spectrometer. Samples were dissolved in a 2:1 mixture of hexafluoroisopropanol and deuterated chloroform ($CDCl_3$). $^{13}C$ NMR were acquired using broad band proton decoupling and relaxation delay of 3 s. Chromium (III) acetylacetonate was added as a relaxation reagent. Chemical shift scale was calibrated to TMS.

Comparative Example 1

500 g solid glycolic acid, 15.6 g hexanediol (2 mol-%) and 0.26 g $SnOct_2$ (0.05 m-%) were added to a 1000 mL flask connected to a rotavapor and an oil bath. Temperature was increased gradually from 130° C. to 190° C. and pressure was decreased gradually from 500 mbar to 30 mbar during four hours. When target temperature and pressure were achieved, reaction was continued for 24 hours. Temperature was increased to 230° C. and reaction was continued for two hours. Yield 392 g, $M_n$ (NMR) 2 000 g/mol, $M_n$ (GPC) 10 800 g/mol, $M_w$ (GPC) 15 000 g/mol, $T_g$ 24° C., $T_c$ 90° C., $\Delta H_c$ 15 J/g, $T_m$ 209° C., $\Delta H_m$ –99 J/g, 65% OH-terminated. $T_{d\ 10\%}$=262° C., FIG. 1.

Example 1

1000 g solid glycolic acid, 31 g hexanediol (2 mol-%) and 1.0 g CaSA (0.1 m-%) were added to a 2000 mL multipurpose reactor equipped with mechanical stirrer. Temperature was increased gradually from 150° C. to 210° C. and pressure was decreased gradually from 1000 mbar to 30 mbar during four hours. The obtained solid was ground to coarse powder. Yield 762 g, $M_n$ (NMR) 1 600 g/mol, $T_g$=14° C. $T_m$=206° C. $\Delta H_m$=–77.7 J/g, 40% OH-terminated.

The coarse polymer powder was then placed into a 2000 ml multipurpose reactor with mechanical stirrer. The reaction was continued in solid state at 170° C. and 30 mbar for 24 h. $M_n$ (NMR) 4 100 g/mol, $M_n$ (GPC) 12 700 g/mol, $M_w$ (GPC) 34 900 g/mol, $T_g$=32° C. $T_m$=206° C. $\Delta H_m$=–74.9 J/g, ca. 100% OH-terminated. $T_{d\ 10\%}$=304° C., FIG. 1.

Example 2

1000 g solid glycolic acid, 31 g hexanediol (2 mol-%) and 5.2 g CaSA (0.1 m-%) were added to a 2000 mL multipurpose reactor with mechanical stirrer. Temperature was increased gradually from 150° C. to 210° C. and pressure was decreased gradually from 1000 mbar to 30 mbar during four hours. The obtained solid was ground to coarse powder. Yield 760 g, $M_n$ (NMR) 1 500 g/mol, $T_g$=22° C. $T_m$=203° C. $\Delta H_m$=−78.4 J/g, 51% OH-terminated.

The coarse polymer powder was then placed into a 2000 ml multipurpose reactor with mechanical stirrer. The reaction was continued in solid state at 170° C. and 30 mbar for 24 h. $M_n$ (NMR) 2 700 g/mol, $T_g$=26° C. $T_m$=206° C. $\Delta H_m$=−74.2 J/g, 84% OH-terminated. $T_{d\ 10\%}$=301° C., FIG. 1.

Example 3

Figure 2:
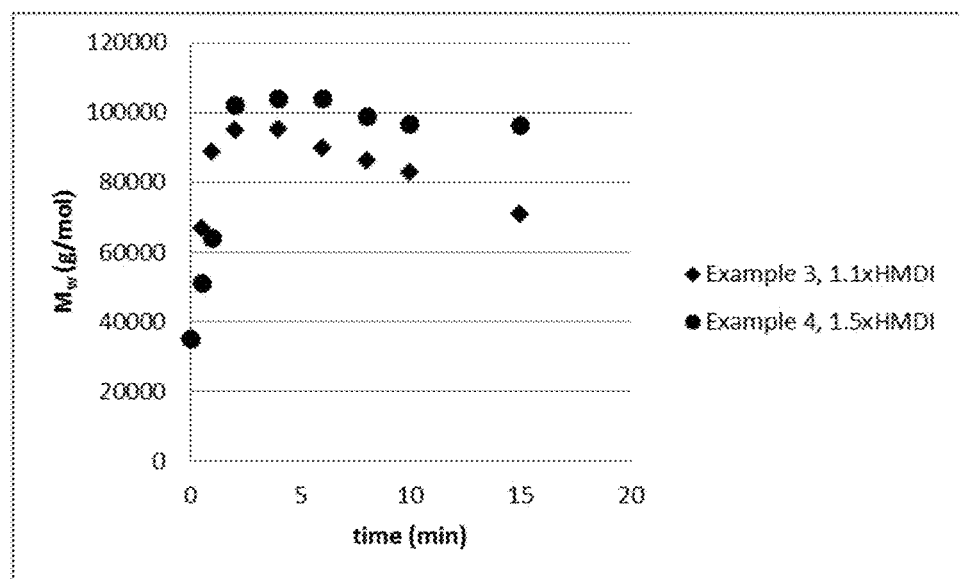
FIG. 2 shows the growth of molecular weights of the polymers of Examples 3 and 4 as a function of time after addition of various amounts of coupling agents.

40 g of prepolymer prepared in Example 1 and hexamethylene di-isocyanate (HMDI) with a ratio of 1.1 was added to into DIT 2CV mixing equipment at 225° C. under $N_2$. Samples were taken at 0.5, 1, 2, 4, 6, 8, 10 and 15 minutes. $M_n$ (GPC) at 2 min 19 700 g/mol, $M_w$(GPC) 94 900 g/mol. At 2 min: $T_g$=32° C. $T_m$=203° C. $\Delta H_m$=−67.3 J/g. The $M_w$ of all the samples are presented in FIG. 2.

Example 4

40 g of prepolymer prepared in Example 1 and hexamethylene di-isocyanate (HMDI) with a ratio of 1. 1.5 was added to into DIT 2CV mixing equipment at 225° C. under $N_2$. Samples were taken at 0.5, 1, 2, 4, 6, 8, 10 and 15 minutes. $M_n$ (GPC) at 2 min 18 400 g/mol, $M_w$(GPC) 102 200 g/mol. At 2 min: $T_g$=31° C. $T_m$=206° C. $\Delta H_m$=−67.6 J/g. The $M_w$ of all the samples are presented in FIG. 2.

Example 5

Stage 1: 250 g of glycolic acid was weighed into a glass flask with magnetic stirrer (no catalyst added). The reactor was kept under $N_2$ flow and the temperature was increased to 190° C. The temperature was gradually increased to 230° C., and pressure decreased to 30 mbar. The polymerization was continued in the melt state for 2 h, after which the polymer was poured into an aluminum foil pan, cooled down, and grinded into powder.

Stage 2: 20 g of the polymer prepared in stage 1 was placed into a glass flask equipped with magnetic stirrer. The flask was set under $N_2$ flow and the temperature was kept at 230° C. until the prepolymer melted. 100 mg (0.5 m-%) of CaSA catalyst was added, the $N_2$ flow was stopped, and polycondensation was continued for 20 min at 30 mbar. The sample was poured into an aluminum foil pan, cooled down at RT, and grinded into powder. $M_n$(GPC)=4 900 g/mol, $M_w$ (GPC)=8 900 g/mol.

Figure 3:
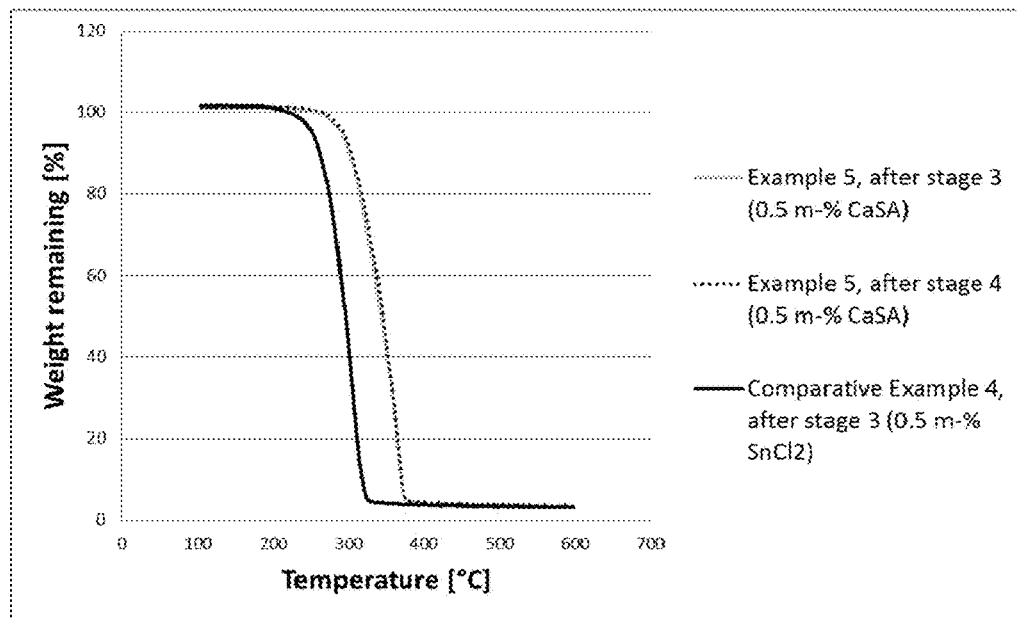
FIG. 3 shows the TGA of Comparative Example 4, and Example 5.

Stage 3: 3 g of the powder prepared in stage 2 was placed as a thin layer (max. 5 mm) into an aluminum foil pan. The sample was kept in ventilated oven at 170° C. for 1 day (solid state polymerization). The yield was weighed (93%, calculated from the start of the solid state polymerization, i.e the original polymer amount in the oven). $T_{d\ 10\%}$=301° C., FIG. 3.

Stage 4: The sample prepared in stage 3 was kept in ventilated oven at 190° C. for another 1 day (2 days solid state polymerization altogether). The yield was weighed (86%, calculated from the start of the solid state polymerization in stage 3, i.e the original polymer amount in the oven). $M_n$ (GPC)=6 500 g/mol, $M_w$ (GPC)=14 800 g/mol. $T_{d\ 10\%}$=303° C., FIG. 3.

Stage 5: The sample prepared in stage 4 was kept in ventilated oven at 210° C. for another 1 day (3 days solid state polymerization altogether). The yield was weighed (76%, calculated from the start of the solid state polymerization in stage 3, i.e the original polymer amount in the oven). $M_n$ (GPC)=7 700 g/mol, $M_w$ (GPC)=23 200 g/mol. The molecular weight and yield results are presented in Table 1. Thermal properties are presented in Table 2.

Example 6

Example 6 was conducted similarly to Example 5, except that 20 mg (0.1 m-%) of CaSA catalyst was added in stage 2 instead of 100 mg of CaSA. The molecular weight and yield results are presented in Table 1. Thermal properties are presented in Table 2.

Example 7

Example 7 was conducted similarly to Example 5, except that 400 mg (2 m-%) of CaSA catalyst was added in stage 2 instead of 100 mg of CaSA. The molecular weight and yield results are presented in Table 1. Thermal properties are presented in Table 2.

Comparative Example 2

Comparative Example 2 was conducted similarly to Example 5, except that 20 mg (0.1 m-%) of Sn(Oct)$_2$ catalyst was added in stage 2 instead of 100 mg of CaSA. The molecular weight and yield results are presented in Table 1.

Comparative Example 3

Comparative Example 3 was conducted similarly to Example 5, except that 20 mg (0.1 m-%) of SnCl$_2$ catalyst was added in stage 2 instead of 100 mg of CaSA. The molecular weight and yield results are presented in Table 1.

Comparative Example 4

Comparative Example 4 was conducted similarly to Example 5, except that 100 mg (0.5 m-%) of SnCl$_2$ catalyst was added in stage 2 instead of 100 mg of CaSA. The molecular weight and yield results are presented in Table 1. After stage 3: $T_{d\ 10\%}$=262° C., FIG. 3.

TABLE 1

Direct polycondensation experiments

| Sample | catalyst | catalyst concentration (m-%) | $M_n$ (SEC) | $M_w$ (SEC) | yield (%) |
|---|---|---|---|---|---|
| Example 6 | CaSA | 0.1 | | | |
| after stage 2 | | | 4800 | 8900 | 100 |
| after stage 3 | | | 6100 | 12900 | 95 |
| after stage 4 | | | 6600 | 14600 | 90 |
| Example 5 | | 0.5 | | | |
| after stage 2 | | | 4900 | 8900 | 100 |
| after stage 3 | | | | | 93 |
| after stage 4 | | | 6500 | 14800 | 86 |
| after stage 5 | | | 7700 | 23200 | 76 |
| Example 7 | | 2 | | | |
| after stage 2 | | | 3800 | 5600 | 100 |
| after stage 3 | | | 7000 | 17000 | 90 |

TABLE 1-continued

Direct polycondensation experiments

| Sample | catalyst | catalyst concentration (m-%) | $M_n$ (SEC) | $M_w$ (SEC) | yield (%) |
|---|---|---|---|---|---|
| after stage 4 | | | 7900 | 20900 | 84 |
| Comparative Example 2 | Sn(Oct)$_2$ | 0.1 | | | |
| after stage 2 | | | 5300 | 10300 | 100 |
| after stage 3 | | | 6600 | 14800 | 84 |
| after stage 4 | | | 7900 | 20200 | 52 |
| after stage 5 | | | insoluble ash | | 3 |
| Comparative Example 3 | SnCl$_2$ | 0.1 | | | |
| after stage 2 | | | 5000 | 9200 | 100 |
| after stage 3 | | | 6700 | 15300 | 83 |
| after stage 4 | | | 7600 | 18800 | 47 |
| after stage 5 | | | insoluble ash | | 2 |
| Comparative Example 4 | | 0.5 | | | |
| after stage 2 | | | 5700 | 11700 | 100 |
| after stage 3 | | | 6600 | 15200 | 86 |
| after stage 4 | | | 7900 | 20400 | 43 |
| after stage 5 | | | insoluble ash | | 14 |

TABLE 2

Thermal properties of polymers polymerized with CaSA catalyst

| Sample | catalyst | catalyst concentration (m-%) | DSC | | | | |
|---|---|---|---|---|---|---|---|
| | | | $T_g$ | $T_m$ | $T_c$ | $\Delta H_m$ | $x_c$ |
| Example 6 after stage 2 | CaSA | 0.1 | 39 | 216 | 185 | 79 | 41 |
| Example 5 after stage 2 | | 0.5 | 39 | 217 | 185 | 89 | 47 |
| after stage 5 | | | 41 | 217 | 190 | 66 | 35 |
| Example 7 after stage 2 | | 2 | 39 | 219 | 175 | 93 | 49 |
| after stage 3 | | | 34 | 216 | 175 | 100 | 52 |
| after stage 4 | | | 43 | 217 | 183 | 91 | 48 |

Example 8

Stage 1: 500 g of glycolic acid was weighed into a 2000 ml multipurpose reactor equipped with mechanical stirrer. The reactor was kept under N$_2$ flow and the temperature was increased to 190° C. The temperature was gradually increased to 230° C., and pressure decreased to 30 mbar. The polymerization was continued in the melt state for 2 h, after which 2.5 g (0.5 m-%) of CaSA catalyst was added. After catalyst addition, the reaction mixture was stirred for 5 min. The product was poured into an aluminum foil pan, cooled down at RT, and grinded into powder. $M_n$ (GPC)=5 800 g/mol, $M_w$ (GPC)=12 000 g/mol. $T_g$=37° C. $T_c$=161° C. $T_m$=217° C. $\Delta H_m$=75 J/g.

Stage 2: The powder prepared in Stage 1 was placed into a 2000 ml multipurpose reactor equipped with mechanical stirrer. The powder was kept at 170° C. and 30 mbar for 1 day under constant stirring (solid state polymerization). $M_n$ (GPC)=6 800 g/mol, $M_w$ (GPC)=16 100 g/mol. $T_{d\,10\%}$=298° C. $T_g$=37° C. $T_c$=170° C. $T_m$=219° C. $\Delta H_m$=87 J/g.

Stage 3: The powder prepared in Stage 2 was kept in a 2000 ml multipurpose reactor at 190° C. and 30 mbar for 1 day under constant stirring (2 days solid state polymerization altogether). $M_n$ (GPC)=8 900 g/mol, $M_w$ (GPC)=26 200 g/mol. $T_{d\,10\%}$=301° C. $T_g$=41° C. $T_c$=178° C. $T_m$=218° C. $\Delta H_m$=83 J/g.

Stage 4: The powder prepared in Stage 3 was kept in a 2000 ml multipurpose reactor at 210° C. and 30 mbar for 1 day under constant stirring (3 days solid state polymerization altogether). $M_n$ (GPC)=9 600 g/mol, $M_w$ (GPC)=32 600 g/mol. $T_g$=44° C. $T^o$=166° C. $T_m$=217° C. $\Delta H_m$=99 J/g.

Example 10

Stage 1: 220 g of glycolic acid and 17.1 g of L-lactic acid (5 mol-%) was weighed into a glass flask with magnetic stirrer (no catalyst added). The reactor was kept under N$_2$ flow and the temperature was increased to 190° C. The temperature was gradually increased to 230° C., and pressure decreased to 30 mbar. The polymerization was continued in the melt state for 2 h, after which the polymer was poured into an aluminum foil pan, cooled down, and grinded into powder.

Stage 2: 20 g of the polymer prepared in stage 1 was placed into a glass flask equipped with magnetic stirrer. The flask was set under N$_2$ flow and the temperature was kept at 230° C. until the prepolymer melted. 100 mg (0.5 m-%) of CaSA catalyst was added, the N$_2$ flow was stopped, and polycondensation was continued for 20 min at 30 mbar. The sample was poured into an aluminum foil pan, cooled down at RT, and grinded into powder. $M_n$ (GPC)=5 400 g/mol, $M_w$ (GPC)=10 600 g/mol.

Stage 3: 3 g of the powder prepared in stage 2 was placed as a thin layer (max. 5 mm) into an aluminum foil pan. The sample was kept in ventilated oven at 170° C. for 1 day (solid state polymerization). The yield was weighed (92%, calculated from the start of the solid state polymerization, i.e the original polymer amount in the oven). $M_n$ (GPC)=7 100 g/mol, $M_w$ (GPC)=17 300 g/mol.

Stage 4: The sample prepared in stage 3 was kept in ventilated oven at 190° C. for another 1 day (2 days solid state polymerization altogether). The yield was weighed (84%, calculated from the start of the solid state polymerization in stage 3, i.e the original polymer amount in the oven). $M_n$ (GPC)=8 900 g/mol, $M_w$ (GPC)=24 800 g/mol.

Stage 5: The sample prepared in stage 4 was kept in ventilated oven at 210° C. for another 1 day (3 days solid state polymerization altogether). The yield was weighed (72%, calculated from the start of the solid state polymerization in stage 3, i.e the original polymer amount in the oven). $M_n$ (GPC)=11 200 g/mol, $M_w$ (GPC)=36 900 g/mol. The molecular weight and yield results are presented in Table 3. Thermal properties are presented in Table 4.

Example 11

Example 11 was conducted similarly to example 10, except that in stage 1 220 g of glycolic acid and 36.2 g of L-lactic acid (10 mol-%) were weighed into the reaction. The molecular weight and yield results are presented in Table 3. Thermal properties are presented in Table 4.

Example 12

Example 12 was conducted similarly to example 10, except that in stage 2, 400 mg (2 mol-%) of CaSA was added to the reaction instead of 100 mg. The molecular weight and yield results are presented in Table 3. Thermal properties are presented in Table 4.

Example 13

Example 13 was conducted similarly to example 10, except that in stage 1 220 g of glycolic acid and 36.2 g of L-lactic acid (10 mol-%) were weighed into the reaction, and in stage 2, 400 mg (2 mol-%) of CaSA was added to the reaction instead of 100 mg. The molecular weight and yield results are presented in Table 3. Thermal properties are presented in Table 4.

TABLE 3

Copolymerization experiments

| Sample | catalyst | catalyst concentration (m-%) | lactic acid concentration (mol-%) | $M_n$ (SEC) | $M_w$ (SEC) | yield (%) |
|---|---|---|---|---|---|---|
| Example 10 | CaSA | 0.5 | 5 | 5 400 | 10 600 | 100 |
| after stage 2 | | | | | | |
| after stage 3 | | | | 7 100 | 17 300 | 92 |
| after stage 4 | | | | 8 900 | 24 800 | 84 |
| after stage 5 | | | | 11 200 | 36 900 | 72 |
| Example 11 | | | 10 | 5 000 | 9 500 | 100 |
| after stage 2 | | | | | | |
| after stage 3 | | | | 7 600 | 19 200 | 91 |
| after stage 4 | | | | 9 400 | 27 700 | 83 |
| Example 12 | | 2 | 5 | 4 300 | 7 100 | 100 |
| after stage 2 | | | | | | |
| after stage 3 | | | | 7 100 | 17 200 | 88 |
| after stage 4 | | | | 8 500 | 23 200 | 80 |
| Example 13 | | | 10 | 4 600 | 8 000 | 100 |
| after stage 2 | | | | | | |
| after stage 3 | | | | 7 700 | 20 000 | 81 |
| after stage 4 | | | | 9 700 | 28 500 | 71 |

TABLE 4

Thermal properties of the copolymers

| Sample | CaSA catalyst concentration (m-%) | Lactic acid concentration (mol-%) | DSC | | | | |
|---|---|---|---|---|---|---|---|
| | | | $T_g$ | $T_m$ | $T_c$ | $\Delta H_m$ | $x_c$ |
| Example 10 | 0.5 | 5 | 39 | 201 | | 66 | 35 |
| after stage 2 | | | | | | | |
| after stage 3 | | | 37 | 202 | | 72 | 38 |
| after stage 4 | | | 39 | 205 | | 86 | 45 |
| after stage 5 | | | 46 | 210 | 141 | 95 | 50 |
| Example 11 | | 10 | 26 | 181 | | 31 | 16 |
| after stage 2 | | | | | | | |
| after stage 3 | | | 35 | 187 | | 49 | 25 |
| after stage 4 | | | 38 | 194 | | 53 | 28 |
| Example 12 | 2 | 5 | 38 | 202 | 129 | 83 | 43 |
| after stage 2 | | | | | | | |
| after stage 3 | | | 35 | 202 | 137 | 84 | 44 |
| after stage 4 | | | 41 | 205 | 150 | 79 | 41 |
| Example 13 | | 10 | 34 | 183 | | 26 | 14 |
| after stage 2 | | | | | | | |
| after stage 3 | | | 36 | 190 | | 81 | 42 |
| after stage 4 | | | 40 | 197 | | 109 | 57 |

Example 14

The following OTR values were measured from solution coated films on Performa White board. Product of Example 10, after stage 5: 700 cm$^3$/m$^2$ day. Product of Example 11, after stage 4: 870 cm$^3$/m$^2$ day.

TABLE 5

Reference TGA data of PGAs with different metal catalysts

| Catalyst | $M_n$ (SEC) | $M_w$ (SEC) | $T_{d\,10\%}$ |
|---|---|---|---|
| no catalyst | 9 300 | 15 200 | 284 |
| 0.5 m-% Sn(Oct)$_2$ | 7 500 | 13 400 | 255 |
| 0.1 m-% Sn(Oct)$_2$ | 8 000 | 15 100 | 261 |
| 0.5 m-% ZnAc$_2$•2H$_2$O | | | 261 |
| 0.5 m-% ZnAc$_2$•2H$_2$O | 7 800 | 14 300 | 273 |
| 0.5 m-% SnCl$_2$ | 10 500 | 20 200 | 254 |
| 0.1 m-% SnCl$_2$ | 16 700 | 28 700 | 255 |

Example 15

Copolymerization of glycolic acid and hexanediol was carried out in a similar fashion as described in Examples 1 and 2. The polymerization was carried out in a 450 L stainless steel reactor. The temperature was gradually increased to 200° C. Simultaneously, the pressure was held for 2.5 h under ambient conditions and then reduced below 30 mbar over a time period of 4.5 h. The melt was held at this pressure for 2 h and the polymer was then removed from the reactor, allowed cooled down, ground to particulate shape and then subjected to 150° C. for 43 h under reduced pressure.

The obtained polymer was then copolymerized with 1,6-hexamethylene diisocyanate in a twin screw extruder. The molar ratio between the prepolymer and the diisocyanate was 1:1.

Standard mechanical test specimens were prepared by injection molding and the resultant polymer exhibited the following mechanical properties:
Tensile strength: 79 MPa
Tensile modulus: 7.3 GPa
Elongation: >100%

INDUSTRIAL APPLICABILITY

The present high-molecular weight aliphatic polyesters exhibit decreased discoloration, good heat and chemical resistance as well as good gas barrier properties, e.g. excellent oxygen and carbon dioxide barrier properties, and can be used alone or as composite materials or multi-layered structures in a wide variety of fields as extruded, compression-moulded, injection-moulded, blow-moulded products, and other formed or moulded products.

Based on the above facts and examples given, it is possible to prepare materials which have high modulus imparting in improved rigidity of the material and may permit reduction of materials in multilayer structures, which contributes to cost saving and environmental benefits, which structures have high elongation useful in biaxial orientation or thermoforming applications yielding layers that are not prone for discontinuities; and which materials have high optical clarity in transparent films.

Further, the polymers prepared herein can be extruded to threads, spun to fibers or with suitable additives extruded to foams. A particular, but not an exclusive list of examples, is the following: multilayer films obtained after extrusion optionally combined with a subsequent blowing or biaxial orientation process for packaging applications, laminated optionally multi-layered films for packaging applications, injection molded articles for use in oil or gas drilling, injection molded articles for various parts or consumer articles, injection molded articles for use in degradable implants in bone repair, foamed products for insulation of sound or against temperature, spun fibers for cloths, textiles and sutures.

The instant polymers can be used for coating of specimens, preferably specimens selected from the group of solid objects and webs, in particular by thermal powder coating or extrusion coating.

The process may also be optimized for reactive extrusion in such way that the above products be directly produced after the described step-growth polymerization process.

CITATION LIST

Patent Literature

U.S. Pat. No. 2,676,945
U.S. Pat. No. 2,683,136
GB 825,335
U.S. Pat. No. 3,442,871
U.S. Pat. No. 4,650,851
U.S. Pat. No. 5,223,630
U.S. Pat. No. 7,235,673
U.S. Pat. No. 4,424,242.
U.S. Pat. No. 4,565,851,
U.S. Pat. No. 4,729,927
U.S. Pat. No. 5,380,813
US 2006217523
US 2009176963
US 2011065871
US 2012027973
US 20140100350

Non Patent Literature

Vert, M. et. al., *Makromol Chem Suppl* 1981, 5, 30-41.

The invention claimed is:

1. Method of producing a telechelic polymer of glycolic acid, comprising the steps of:
   providing glycolic acid;
   providing a difunctional monomer;
   subjecting said glycolic acid to polymerization in the molten state in the presence of a catalyst and said difunctional monomer;
   continuing polymerization in the solid state at 200° C. or less for a prolonged period under reduced pressure to provide a polymeric chain formed by residues derived from glycolic acid and said difunctional monomer,
   wherein the catalyst is an organic sulphonic acid having a boiling point in excess of 250° C.

2. The method according to claim 1, wherein a hydroxyl-terminated polymer chain is formed by the steps of:
   providing glycolic acid;
   providing a hydroxy-terminated monomer;
   subjecting said glycolic acid to condensation polymerization in the molten state in the presence of an esterification catalyst and said hydroxy-terminated monomer;
   continuously removing water formed during condensation polymerization; and
   continuing polymerization in the solid state at 200° C. or less for a prolonged period under reduced pressure to provide a polymeric chain formed by residues derived from glycolic acid and said hydroxy-terminated monomer,
   wherein the catalyst is an organic sulphonic acid having a boiling point in excess of 250° C.

3. The method according to claim 1, wherein condensation polymerization, in combination with a dehydration step, is continued until a polymer comprising least 5 residues of glycolic acid is obtained.

4. The method according to claim 1, further comprising preparing glycolic acid homo- or copolymers.

5. The method according to claim 1, wherein the yield of the polymer is more than 90%.

6. The method according to claim 1, further comprising preparing glycolic acid homopolymer exhibiting a molecular weight above 30,000 g/mol.

7. The method according to claim 1, wherein condensation polymerization is carried out in the presence of a catalyst selected from the group of organic sulphonic acid compounds having a boiling point of more than 350° C.

8. The method according to claim 1, wherein condensation polymerization is carried out in the presence of a catalyst selected from the group of organic sulphonic acid compounds, which have at least one organic residue with at least 10 carbon atoms.

9. The method according to claim 1, wherein condensation polymerization is carried out in the presence of a catalyst selected from the group of organic sulphonic acid compounds, which have at least one organic residue with an alicyclic residue comprising 1 to 3 alicyclic rings, optionally carrying one or more substituents, comprising camphor sulphonic acid and derivatives thereof.

10. The method according to claim 1, wherein condensation polymerization is carried out in the presence of lactic acid.

11. The method according to claim 1, wherein polymerization is continued to provide an essentially linear hydroxy-terminated polymeric chain.

12. The method according to claim 1, wherein polymerization is continued to provide an essentially branched hydroxy-terminated polymeric chain.

13. The method according to claim 1, wherein polymerization is carried out in a solvent.

14. The method according to claim 1, further comprising producing a polymer, having a molecular weight (Mn) of about 20,000 to 1,000,000 g/mol.

15. The method according to claim 1, wherein the polymerization is carried out in the presence of a sulphonic acid catalyst first in melt stage and the in bulk stage to yield a linear polymer having a molecular weight (Mn) in excess of 20,000 g/mol.

16. The method according to claim 1, wherein the polymer obtained is subjected to polymerization in the presence of a chain extender to provide a linear polymer having a molecular weight (Mn) of 20,000 to 1,000,000 g/mol.

17. The method according to claim 16, wherein the chain extenders are selected from the group of diepoxides and diisocyanates.

18. A telechelic homo- or copolymer of glycolic acid produced by a method of producing a telechelic polymer of glycolic acid, the method comprising the steps of:
   providing glycolic acid;
   providing a difunctional monomer;
   subjecting said glycolic acid to polymerization in the presence of a catalyst and said difunctional monomer; and
   continuing polymerization to provide a polymeric chain formed by residues derived from glycolic acid and said monomer,
   wherein the catalyst is an organic sulphonic acid having a boiling point in excess of 250° C.

19. A telechelic homo- or copolymer of glycolic acid exhibiting a glass transition point in excess of 37° C., and a decomposition temperature, $T_{d\ 10\%}$ of at least 295° C., and having a molecular weight (Mn) of 30,000 to 1,000,000 g/mol.

* * * * *